(12) United States Patent
Ha et al.

(10) Patent No.: US 6,472,451 B2
(45) Date of Patent: Oct. 29, 2002

(54) RADIATION CURABLE ADHESIVE FOR DIGITAL VERSATILE DISC

(75) Inventors: Chau Thi Minh Ha, Arlington Heights, IL (US); Vadim V Krongauz, Barlett, IL (US); Rajni Jaria, Des Plaines, IL (US); Michael G. Sullivan, Elgin, IL (US)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/379,781

(22) Filed: Aug. 24, 1999

(65) Prior Publication Data

US 2002/0032251 A1 Mar. 14, 2002

Related U.S. Application Data

(63) Continuation-in-part of application No. 09/048,980, filed on Mar. 27, 1998, now abandoned.

(51) Int. Cl.$^7$ ............... C08F 2/46; C08F 2/50
(52) U.S. Cl. ............ 522/97; 522/90; 522/96; 522/93; 522/116; 522/126; 522/127; 522/136; 522/144; 522/152; 522/173; 430/270.1; 430/271.1; 430/321; 524/80; 524/750
(58) Field of Search ............... 522/90, 93, 96, 522/97, 116, 126, 127, 136, 144, 152, 173; 430/321, 271.1, 270.1; 524/82, 750

(56) References Cited

U.S. PATENT DOCUMENTS

| | | |
|---|---|---|
| 4,310,919 A | 1/1982 | Slaten |
| 4,423,137 A | 12/1983 | Rester |
| 4,686,543 A | 8/1987 | Tani |
| 4,731,620 A | 3/1988 | Yabe |
| 4,760,012 A | 7/1988 | Mochizuki |
| 4,861,637 A | 8/1989 | Ueda et al. |
| 4,865,949 A | 9/1989 | Yamamuro |
| 4,906,675 A | 3/1990 | Inagaki et al. |
| 4,915,997 A | 4/1990 | Yamamuro |
| 4,931,337 A | 6/1990 | Miyazaki |
| 4,954,591 A * | 9/1990 | Belmares ............ 526/264 |
| 5,128,388 A | 7/1992 | Komori |
| 5,128,391 A * | 7/1992 | Shustack ............ 522/92 |
| 5,213,947 A | 5/1993 | Ueda et al. |
| 5,360,652 A * | 11/1994 | Kobayashi et al. ......... 428/64 |
| 5,426,166 A * | 6/1995 | Usifer et al. .......... 526/301 |
| 5,445,855 A | 8/1995 | Tokita |
| 5,484,864 A * | 1/1996 | Usifer et al. .......... 526/301 |
| 5,550,171 A | 8/1996 | Kucyznski |
| 5,624,759 A * | 4/1997 | Usifer et al. ........ 428/424.2 |
| 5,635,268 A | 6/1997 | Miyake |
| 5,847,021 A * | 12/1998 | Tortorello et al. ......... 522/90 |
| 6,017,603 A | 1/2000 | Tokuda et al. ............ 428/64 |

FOREIGN PATENT DOCUMENTS

| | | | |
|---|---|---|---|
| EP | 243802 | | 11/1987 |
| JP | 10287718 | * | 10/1998 |
| WO | 98/36325 | * | 8/1998 |
| WO | 98/45344 | * | 10/1998 |

OTHER PUBLICATIONS

Roffey, "Photopolymerization of Surface Coatings," (J. Wiley & Sons), 1982, pp. 67–136.
Arkles, J.R., "Factors Comtributing to the Stability of Alkoxysilanes in Aqueous Solution," Silicon Compounds (Juls America, Inc. 1991), pp. 65–73.
Krongauz and Tortorello, "Reactive Diluents and Properties of Ultraviolet–Cured Polycarbonate Urethane Acrylates", Journal of Applied Polymer Science (1995) vol. 57 (13), 1627–1636.
Kirsh, Y.E., "N–Vinylamides Synthesis, Physicochemical Properties, Specific Features of radical Polymerization", Polymer Science (1993) vol. 35 (2), 271–285.
Allen, N.S., "Polymer Photochemistry", Photochemistry (1997), vol. 28, 381–452.
Block, D.G., "Bonding still a sticky issue for DVD", Radtech Report (Mar./Apr. 1997), 25–27.
Chiou et al., "Real–Time and in Situ Rheological Studies on the UV Curing Kinetics of Thiol–ene Polymers", Macromolecules, vol. 30, No. 23 (1997) pp.: 7322–7328.
Chio et al., "UV Crosslinking of Thiol–ene Polymers: A Rheological Study", ACS Symp. Ser. (1997):673.
Takeishi, M., "Photopolymerization of N–vinylpyrrolidone Accelerated by Oxygen", Journal of Polymer Science: Part C: Polymer Letters, vol. 27 (1989), pp. 301–305.
Lai, Y., "Effect of Crosslinkders on Photocopolymerization of N–vinylpyrrolidone and Methacrylates to Give Hydrogels", J. Appl. Polym. Sci. (1997), 66(8), pp. 1475–1484 (Chemical Abstract enclosed).

* cited by examiner

Primary Examiner—James J. Seidleck
Assistant Examiner—Saza L. McClendon
(74) Attorney, Agent, or Firm—Pillsbury Winthrop LLP

(57) ABSTRACT

A UV-curable acrylate base adhesive composition for digital versatile discs and other substrates, a method for bonding verstile digital disc layers together with a UV-curable adhesive, and a digital versatile disc bonded by a UV-curable or a radiation curable adhesive. The adhesive comprises acrylate functional components, non-acrylate reactive diluents (e.g. having acrylamide, or N-vinyl functionality) and thiol compounds.

25 Claims, 2 Drawing Sheets

RADIATION CURABLE ADHESIVE FOR DIGITAL VERSATILE DISC

CROSS REFERENCE TO RELATED APPLICATIONS

This application is a continuation-in-part application of U.S. Ser. No. 09/048,980, filed Mar. 27, 1998 now abandoned, which is hereby incorporated in its entirety by reference. In addition, this application claims priority from PCT application serial no. PCT/NL/99/00168, filed Mar. 24, 1999, which is hereby incorporated in its entirety by reference.

FIELD OF THE INVENTION

This invention relates to a radiation-curable adhesive formulation useful for bonding together surfaces of digital versatile discs.

DESCRIPTION OF RELATED ART

The compact disc, or CD as it is commonly known, revolutionized the recording and computer industries, making the storage of enormous amounts of data, such as music, possible in an inexpensive, readily available medium. The technology behind the compact disc has been improved and expanded to meet the increasing storage needs of the computer and entertainment industries, culminating in the creation of digital versatile discs, or DVDs. While compact discs and digital versatile discs store information in the same general manner, the DVD design exploits CD technology to create a superior product.

Structurally, digital versatile and compact discs are very similar to one another. The information bearing surfaces of both discs are marked with indentations, or pits, arranged in a continuous spiral pattern. As the drive laser moves across the pits, the laser beam is reflected back to the driver, which receives the light signal and converts it into an appropriate format, for example, audio, video, graphic or textual format. DVDs store more data than equivalent CDs because, inter alia, the information-carrying pits are smaller and are intimately spaced in tight tracks, as opposed to the wide tracks of CDs. DVD players utilize lasers which emit red light at 650 nm and 635 nm, which are shorter wavelengths than the infrared light used in conventional CD players. These shorter wavelengths enable DVD players to accurately read the smaller, more densely packed pits of the digital versatile discs.

The compact and digital versatile discs, composed of a core member around which the information bearing surface is symmetrically arranged, are the same diameter (120 mm), and the same thickness (1.2 mm). However, instead of a single layer characteristic of traditional compact discs, digital versatile discs are made of two 0.6 mm layers of polycarbonate. This reduces the amount of distance between the surface of the discs and the pits, such that the laser penetrates less plastic in the DVDs than in CDs when accessing information. Consequently, the thinner DVD substrate enhances the read accuracy of the laser. The two bonded sides of the DVDs serve to strengthen the discs, preventing warping. Thus, digital versatile discs have greater capacity and reduced responses to environmental factors than compact discs.

Digital versatile discs may be created by variations on a few basic processes, as disclosed, for example, by U.S. Pat. Nos. 4,310,919 and 4,423,137. For example, during production of digital versatile discs, a master glass disc with the desired information is created, using a laser beam to record data from the center of the master glass disc to the outer edge of the master glass disc in a spiral pattern. After recording, the master glass disc is developed by spinning a sodium hydroxide solution over the glass surface, revealing the pits created by the laser. The developed master glass disc is then metallized with a coating of silver, followed by a coating of nickel. The nickel layer is then separated from the silver-coated master glass disc, forming a nickel reverse image of the data, known as the father copy. One or more nickel copies of this father may be generated, which can be used as a stamper in an injection molding machine to mass produce discs. Molten polycarbonate is then shot into molds containing the stamper, creating polycarbonate discs carrying the desired information. The discs are then removed from the molds with the lacquer layer adhered thereto, and a reflective metal, usually aluminum, is evaporated or sputtered on top of the polycarbonate first layer containing the information. A protective coating of lacquer is then applied over the reflective layer and dried or cured, forming a single sided disc. The stamped side of the single-sided DVD is backed by a dummy layer, onto which graphics may be applied.

The basic DVD configuration is usually modified to further enhance the capacity of the discs. The capacity of a single sided disc may be almost doubled by applying a semi-reflective data layer zero, comprising, for example, gold, over the reflective aluminum layer one. The gold layer may be read by the driver laser on a low power setting, while the aluminum layer may be accessed by increasing the power of the laser. This results in a double layer of information on a single side of a disc, imparting the DVD with currently about 8.5 GB of capacity.

Two of these single sided, dual layer discs may be bonded together back to back with a thick layer of adhesive, creating double sided, double layer digital versatile discs with currently about 17 GB of storage space. The first and second disc layers are bonded such that they are parallel to and equidistant from the core member of the disc. The adhesive employed must provide high shear strength, while keeping the information layers uniformly equidistant from each other.

Three technologies are currently employed for DVD bonding, namely contact adhesives, cationic or PSA UV bonding, and free radical UV bonding. The formulations must provide adhesion between the aluminum and polycarbonate layers, the gold and polycarbonate layers, and the lacquer and the polycarbonate layers, and various combinations thereof. Furthermore, the adhesive coatings must have a high cure speed and must wet the substrate. Following cure, these materials must have high dimensional stability and durability.

However, strong, long-lasting adhesion between DVD component layers, without compromising the other desirable properties, such as dimensional stability of the disc, is not achievable with the existing systems.

Contact adhesives are applied to discs in a hot melt process, during which temperatures are kept between 120° C. and 160° C. The adhesive is spread on the discs as a thin layer by roll coating both inner bonding surfaces. The halves are then pressed together and the adhesive is allowed to set. Flat discs may be produced at high yield rates via this method, but these discs tend to warp when stored above 70° C. or in humid environments.

During cationic UV bonding, the adhesive is screened onto both the discs, UV irradiated, and then pressed together.

The bond strengthens with time due to aging, such that after approximately 24 hrs, the disc halves are permanently attached to each other. The discs produced by this method are flatter than with other processes, but cationic UV bonding necessitates an additional lacquer coating step. Additionally, the discs must stay in a curing station for a period to ensure complete bonding prior to stacking, requiring an extra stacker, which increases equipment costs.

During free radical UV bonding, acrylate lacquer is placed on the leading edge of a disc, after which a second disc is placed on top, and the pair is spun. The weight of the second disc promotes the movement of the lacquer toward the inner edge of the metal layer, while the spinning causes the lacquer to move to the outer edge. The adhesive is cured via UV irradiation after the spin coating process is completed. Radical UV bonding is prone to bubble formation between the bonded layers. In the dual layer construction, bubbles can impair the ability of the drive laser to read the information-bearing pits. Variations in the aluminum layer prior to bonding can cause uneven curing, which prevents the formation of flat discs. Furthermore, acrylates shrink upon cure, often to substantial degrees, thereby preventing the formation of flat discs. This shrinkage may also reduce the environmental stability of bonded discs.

SUMMARY OF THE INVENTION

The object of the current invention is a an adhesive, that binds sputter-coated metallized or siliconized, polycarbonate substrates to UV-cured lacquer surfaces, that is stable following exposure to elevated temperature and humidity, possesses excellent mechanical properties, has suitable viscosity, acceptable shrinkage and has a low degree of volatility post-cure. The result is an adhesive that imparts impact resistance and superior shear strength to bonded digital versatile discs or to other substrates.

The object of the invention is achieved by a UV or radiation-curable composition for use as an adhesive material comprising the combination of the following pre-mixture ingredients:

(A) about 5 wt. % to about 80 wt. % of at least one UV or radiation-curable acrylate oligomer;

(B) about 10 wt. % to about 20 wt. % of at least one non-acrylate functional reactive diluent;

(C) about 10 wt. % to about 80 wt. % of at least one acrylate functional reactive diluent;

(D) about 0.5 wt. % to about 10 wt. % of at least one radical forming sulphur compound, and (E) optionally about 0.1 wt. % to about 15 wt. % of one or more photoinitiators, wherein the "pre-mixture ingredients" correspond to the identity of radiation-curable composition components prior to mixture with other ingredients.

The present invention provides for the production of an improved adhesive for bonding digital versatile discs, methods for bonding disc components together, and discs with improved impact resistance due to the enhanced bonding properties of the adhesive compound.

The radical forming sulphur compound generally will be a thiol compound or a polysulphide compound. Hereinafter, mostly it is referred to thiol compound, but this is just as an example.

Acrylate oligomers are well known in field of adhesives. According to the invention, it is supposed, that co-polymerization of thiol and non-acrylate functional compounds (sometimes mentioned as "ene") with urethane acrylates creates a urethane-acrylate-thiol-ene hybrid adhesive coating with superior properties to urethane acrylate coatings lacking the thiol-ene system. The non-acrylate functional compound can e.g. be an acrylamide or an N-vinyl group comprising compound. Because standard adhesive materials do not provide strong, long lasting bonding between, for example, aluminum and polycarbonate substrates, especially under adverse environmental conditions, particularly elevated temperatures and humidity levels, the creation of hybrid acrylate-thiol-ene adhesive formulations is a marked improvement over the current methodology.

Although not certain, the thiol-ene systems appear to allow copolymerization of non-acrylate functional moieties with acrylate moieties. In the absence of thiols, copolymerization of, for example, N-vinyl compounds is slow. Thiol compounds act as chain transfer agents, which may reduce cure speed. In contrast, thiol-ene systems in acrylate compounds enhance cure speed and reduce shrinkage of cured adhesives during cure of adhesive films.

DETAILED DESCRIPTION OF THE INVENTION

Figure 1:
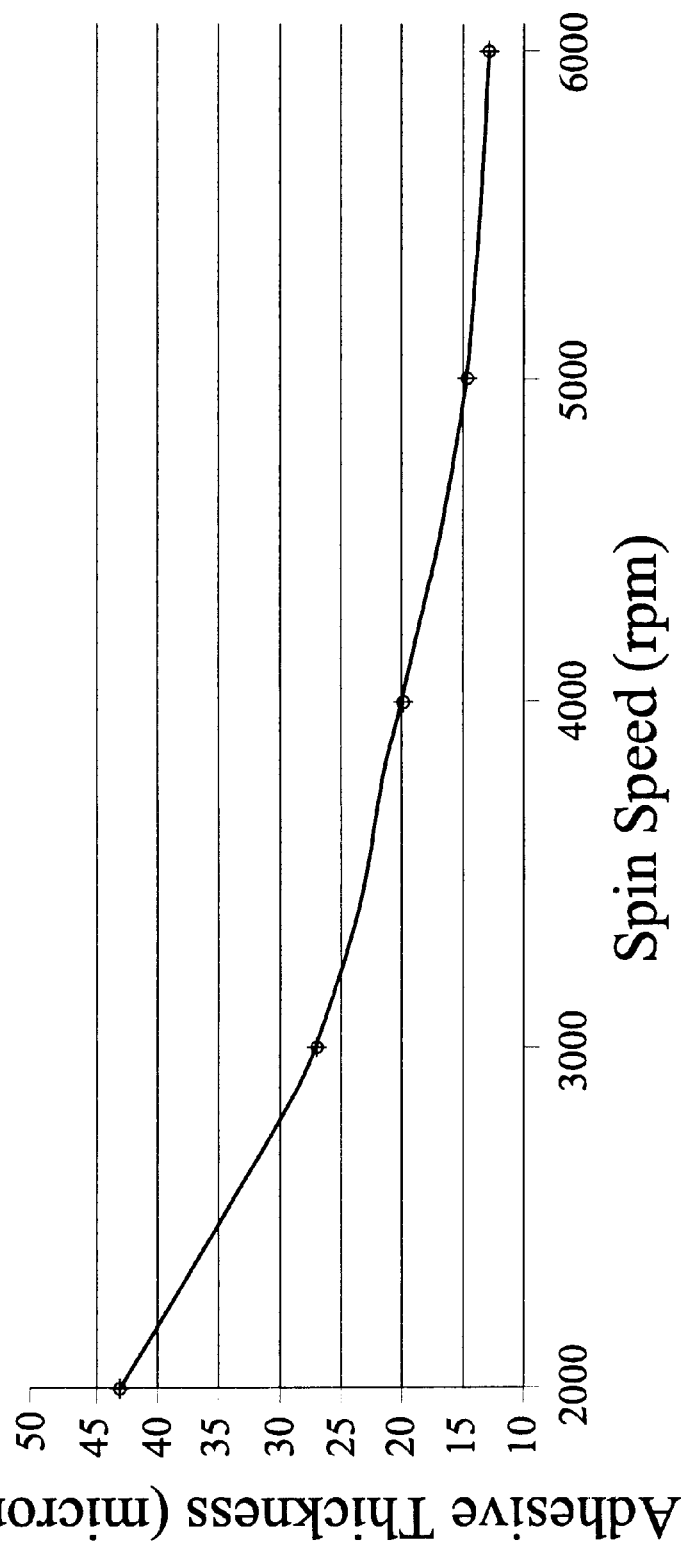
FIG. 1 relates adhesive thickness, plotted on the ordinate, with spin speeds, plotted on the abscissa.

Construction of a DVD requires bonding two 0.6 mm substrates together, using an optical adhesive. One or both substrates are vacuum coated with a thin layer of aluminum, gold, silicon, silicon carbide or silicon nitride. DVD bonding optical adhesive needs to adhere well to these surfaces and to polycarbonate, from which the discs are made. Substrate layers bonded together in various combinations according to the invention include, but are not limited to, plastics, metallics and ceramics. The optical adhesive must not corrode the surfaces in hot and/or humid environments. Additional requirements for DVD bonding adhesive include complete edge cure, high cure rate in air and optical clarity for DVD-9, DVD-18 or other sizes.

Radiation curable adhesive formulations based on hybrid acrylate-thiol-ene copolymerization are unexpectedly advantageous DVD adhesives. The adhesives bond strongly to, for example, aluminized surfaces of the polycarbonate substrates of a DVD, cure well in air and have good edge cure characteristics. Such formulations also do not corrode the aluminum surface.

The types and amounts of acrylate oligomer, non-acrylate functional reactive diluent, acrylate functional reactive diluents, thiol compounds and additives may be adjusted according to the ultimate use of the product. The composition may be tailored to maximize the adhesiveness, reduce the viscosity, shorten cure speed, and the like of the cured material. For example, acrylate functional reactive diluent and optionally silane-containing compounds, may be added at varying effective concentrations to achieve improved viscosity and adhesion, respectively. By altering the ratios of components, other desirable properties, including high optical transparency, good hardness, chemical resistance, and abrasion resistance, may be promoted.

The exact combinations selected for the use in radiation-curable adhesive coating compositions may vary, depending upon the other components of the composition and the light source used to cure the composition. Components should be excluded from the formulation which, prior to cure, cause insoluble salts to form, which may impair the optical properties of the bonded disc.

The radiation-curable compositions can be cured by conventional means. For instance, the radiation source can be a conventional light source, such as, for example, UV lamps available from Fusion Systems Corp. In addition, low-, medium- and high-pressure mercury lamps, superactinic fluorescent tubes or pulse lamps are suitable. Radiation-cure is preferably by actinic radiation and more preferably by UV radiation. When using the preferred UV cure of the adhesive compositions, proper control of light intensity is important to help control shrinkage of the polymerized material.

The radiation-curable oligomer (A) can be any radiation-curable oligomer used in radiation-curable, adhesive coating compositions. An example of a suitable radiation-curable oligomer includes an urethane oligomer having a molecular weight of at least about 500 and containing at least one ethylenically unsaturated group that can be polymerized through actinic radiation. For example, if the diluent is present in the coating composition, the ethylenically unsaturated group can be the reactive terminus of the oligomer to which the reactive diluent is bound when the composition is cured. Preferably, the oligomer has two terminal radiation-curable functional groups, one at each end of the oligomer.

Representative oligomers are disclosed in, for example, U.S. Pat. No. 4,932,750.

The radiation-curable oligomer is generally present in an amount of about 5% or more, preferably in an amount of about 10% or more, and more preferably, about 15 wt. % or more. The acrylate oligomer generally is present in an amount of about 80% or less, preferably about 75 wt. % or less, and more preferably about 60 wt. % or less.

Examples of suitable radiation-curable functional groups which can be present on the oligomer include ethylenically unsaturated groups like acrylate or methacrylate, or mixtures thereof.

Preferably, the radiation-curable group in the oligomer is an acrylate group.

The radiation-curable oligomer includes an oligomer backbone, at least two radiation-curable groups, and linking groups which link the radiation-curable groups to the oligomer backbone. The oligomer preferably, but not necessarily, has a linear structure, and can include block or random copolymeric structures. Oligomers having urethane linkages and acrylate radiation-curable groups are preferred.

The oligomer backbone can be, for example, based on a polyether, polyolefin, polyester, polycarbonate, acrylic, hydrocarbon, polyolefin, or copolymers thereof. Preferably, the oligomer backbone comprises urethane units.

The radiation-curable oligomer can be an acrylic oligomer comprising at least one radiation-curable (meth)acrylate group, and preferably, at least one acrylate group. These are known in the art as acrylated acrylics.

Oligomer synthetic routes for acrylated acrylics can, for example, involve an esterification of a hydroxyl-functional acrylic oligomer with (meth)acrylic acid, or the reaction of an epoxy-functional acrylic oligomer with (meth)acrylic acid. These acrylated acrylics can include urethane linkages. Preferred acrylated acrylic oligomers include species of at least Mn 5,000. Preferred acrylated urethane acrylics are described in EP-A-858470.

Acrylated acrylics can be prepared by known synthetic methods including, for example, partial esterification of acrylic polymers having pendant carboxylic acid group with hydroxyethyl acrylate or glycidyl methacrylate, or in the alternative, acrylation of glycidyl methacrylate terpolymer with acrylic acid.

The acrylic oligomer typically will have a copolymeric backbone. The Tg of the oligomer can be lowered by decreasing the content of methyl methacrylate.

(Meth)acrylic acid and ester polymers are disclosed in, for example, *Encyclopedia of Polymer Science & Engineering*, Vol. 1, 1985, pgs. 211–305.

The oligomer backbone can comprise one or more oligomeric blocks coupled with each other via, for example, urethane linkages. For example, one or more types of polyol prepolymers can be linked by methods known in the art.

If the oligomer backbone is a polyether, the resulting adhesives can have a low glass transition temperature and good mechanical properties. If the oligomer backbone is a polyolefin, the resulting adhesives can have a further improved water resistance. Polycarbonate-based oligomers can provide for good stability. Polyether backbones are preferred.

Oligomers with repeating urethane units can be, for example, prepared by reaction of (i) an oligomer polyol, (ii) a di- or poly-isocyanate and (iii) a hydroxy functional ethylenically unsaturated monomer such as, for example hydroxyalkyl(meth)acrylate.

If an oligomer backbone polyol is used, preferably it has on average at least about 2 hydroxyl groups. The oligomer backbone polyol may have, on average, more than 2 hydroxyl groups. Examples of such an oligomer diol include polyether diols, polyolefin diols, polyester diols, polycarbonate diols, and mixtures thereof. Polyether and polycarbonate diols, or combinations thereof, are preferred.

If a polyether diol is used, preferably the polyether is a substantially non-crystalline polyether. Preferably, the polyether comprises repeating units of one or more of the following monomer units:

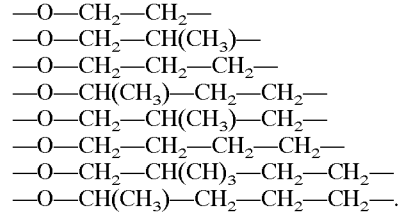

An example of a polyether polyol that can be used is the polymerization product of 20 percent by weight of 3-methyltetrahydrofuran and 80 percent by weight of tetrahydrofuran, both of which have undergone a ring opening polymerization. This polyether copolymer contains both branched and non-branched oxyalkylene repeating units and is marketed as PTGL 1000™ (Hodogaya Chemical Company of Japan). Another example of a polyether in this series which can be used is PTGL 2000™ (Hodogaya Chemical Company). Another example of a polyether which can be used is polyarylicdiol, like ethoxylated or propoxylated bisphenol-A or bisphenol-F.

Examples of polycarbonate diols are those conventionally produced by the alcoholysis of diethylene carbonate with a diol. The diol can be, for example, an alkylene diol having about 2 to about 12 carbon atoms, such as, 1,4-butane diol, 1,6-hexane diol, 1,12-dodecane diol, and the like. Mixtures of these diols can also be utilized. The polycarbonate diol can contain ether linkages in the backbone in addition to carbonate groups. Thus, for example, polycarbonate copolymers of alkylene oxide monomers and the previously described alkylene diols can be used. Admixtures of the polycarbonate diols and polycarbonate copolymers can also be utilized.

Polycarbonate diols include, for example, DURACARB 122™ (PPG Industries) and PERMANOL KM10-1733™ (Permuthane, Inc., Ma.). DURACARB 122™ is produced by the alcoholysis of diethylcarbonate with hexane diol.

Suitable polyolefin polyols preferably comprise hydrogenated polybutadiene, and in particular, 1,2- and 1,4 copolymerized butadiene.

Any organic polyisocyanate (ii), alone or in admixture, can be used as the polyisocyanate. The polyisocyanate compounds which are employed in forming the urethane acrylate oligomers can be any organic isocyanate compound having at least two free isocyanate groups. Included are aliphatic, cycloaliphatic, and aromatic polyisocyanates. Polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be used. With the reaction, a product is obtained which is end-capped with the reaction product from the isocyanate/ethylenically unsaturated monomer reaction on at least one end of the molecule. "End-capped" means that a functional group caps one of the two ends of the oligomer diol.

The isocyanate/hydroxy functional monomer reaction product attaches to the oligomer backbone (i) diol via a urethane linkage. The urethane reactions can take place in the presence of a catalyst. Catalysts for the urethane reaction include, for example, dibutyl-tin dilaurate, diazabicyclooctane crystals and the like.

Preferably the polyisocyanate (ii) is a diisocyanate. Examples of diisocyanates (ii) include isophorone diisocyanate (IPDI), tetramethylxylene diisocyanate (TMXDI), toluene diisocyanate (TDI), diphenylmethylene diisocyanate, hexamethylene diisocyanate, cyclohexylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and polyalkyloxide and polyester glycol diisocyanates such as polytetramethylene ether glycol terminated with TDI and polyethylene adipate terminated with TDI, respectively. Preferably, the diisocyanates are non-yellowing diisocyanates such as isophorone diisocyanate.

Generally the compound providing a reactive terminus (iii) is an olefinically unsaturated compound employed for the preparation of the present urethane acrylate oligomers, and may be monomeric or polymeric and is characterized by the presence of a moiety which can react with isocyanate such as an active hydrogen group. Preferably, the active hydrogen group is hydroxy. Illustrative of unsaturated polymerizable monomeric organic compounds having an isocyanate reactive active hydrogen group are 2-hydroxyethyl acrylate, 2-hydroxyethyl methacrylate, 2-hydroxypropyl acrylate, 2-hydroxypropyl methacrylate, diethylene glycol monoacrylate, diethylene glycol monomethacrylate, glycerine dimethacrylate, dimethylol propane dimethacrylate, reaction products of polyester glycols of acrylic or methacrylic acid and the like.

The polyol used to prepare the urethane oligomer generally has a molecular weight of about 200 g/mol to about 5,000 g/mol, and preferably, about 500 g/mol to about 4,000 g/mol, and more preferably, about 1,000 g/mol to about 3,000 g/mol. The urethane oligomer with radiation curable groups generally has a number average molecular weight of about 1,000 to about 10,000, and preferably about 1,500 to about 5,000. Suitable syntheses of urethane oligomers are disclosed in, for example, U.S. Pat. Nos. 5,336,563 and 5,409,740. Mixtures of oligomers can be used. A preferred urethane acrylate oligomer is CN 966-J75™ obtained from Sartomer, Inc. (Pennsylvania), which is an aliphatic polyurethane acrylate.

The composition according to the invention comprises at least two reactive diluents. The reactive diluents can be used to adjust the viscosity of the adhesive composition. Thus, the reactive diluents can each be a low viscosity monomer containing at least one functional group capable of polymerization when exposed to actinic radiation. At least one non-acrylate functional (or -ene) reactive diluents and one acrylate functional reactive diluent is used.

The reactive diluents are preferably added in such an amount that the viscosity of the coating composition is in the range of about 100 to about 1,000 mPas. Suitable amounts of the reactive diluents have been found to be about 5 wt % to about 80 wt %, and more preferably about 10% to about 75% by weight.

The reactive diluents preferably have a molecular weight of not more than about 550 or a viscosity at room temperature of less than about 500 mPas (measured as 100% diluent).

The functional group present on the reactive diluents may be of the same nature as that used in the radiation-curable oligomer. Preferably, the radiation-curable functional group present in the reactive diluent is capable of copolymerizing with the radiation-curable functional group present on the radiation-curable oligomer.

The non-acrylate functional reactive diluent (B) comprises a group capable of radical polymerisation, not being an acrylate or methacrylate group. Suitable non-acrylate functional groups include acrylamide, methacrylamide, N-vinyl, vinylether, vinylester and the like.

In a first embodiment of this invention, the non-acrylate functional reactive diluent (B) comprises a vinyl group.

Such vinyl reactive diluent preferably has a vinylether or N-vinyl functional group. More preferably, N-vinyl is used. Suitable examples of vinyl monomers are laurylvinyl ether, 2-ethylhexylvinyl ether, hexanedioldivinylether, N-vinyl formamide and derivatives thereof, N-vinyl carbazole, N-vinyl-caprolactam, N-vinylpyrrolidone and the like.

As vinyl reactive diluent, N-vinylpyrrolidone or N-vinyl caprolactam is preferred.

In a second embodiment of this invention, the non-acrylate functional reactive diluent (B) comprises an acrylamide group such as an alkyl acrylamide, an alkylmethacrylamide, or an aryl acrylamide. Preferably, the photopolymerizable amide comprises an alkyl acrylamide, such as N,N-dimethyl acrylamide, N-isopropyl acrylamide, N,N-diethyl acrylamide, N,N-dimethylamino propylacrylamide, and morpholinoacrylamide.

The non-acrylate functional reactive diluent (B) preferably is present in an amount of about 3 wt. % or more, and more in particular in about 5 wt. % or more.

Suitable amounts of the reactive acrylate functional diluent system (C) have been found to be about 10 wt % to about 80 wt %, and preferably, about 10 wt. % to about 70 wt. %, and more preferably, about 25 wt. % to about 60 wt. %. If more than one reactive diluent is present, the amounts of reactive diluent are added together to determine the amount of the diluent system.

Preferably, the reactive diluent system comprises monomers having an acrylate functionality and an $C_4$–$C_{20}$ alkyl or polyether moiety. Examples of such reactive diluents are hexyl acrylate, 2-ethylhexyl acrylate, isobornyl acrylate, decyl acrylate, lauryl acrylate, stearyl acrylate, ethoxyethoxy-ethyl crylate, isodecyl acrylate, and isooctyl acrylate.

Another preferred type of reactive diluent is a compound including an aromatic group. Examples of diluents having an aromatic group include: ethyleneglycolphenyletheracrylate, polyethyleneglycolphenyletheracrylate, polypropyleneglycolphenyletheracrylate, and alkyl-substituted phenyl derivatives of the above monomers, such as polyethyleneglycolnonylphenyletheracrylate.

A preferred acrylate monomer diluent, is isobornyl acrylate, or isooctylacrylate.

Furthermore, the reactive diluents can contain two groups capable of polymerization using actinic radiation. A diluent having three or more of such reactive groups can be present as well. Examples of such monomers include: $C_2$–$C_{18}$ hydrocarbondioldiacrylates, $C_4$–$C_{18}$ hydrocarbondivinylethers, $C_3$–$C_{18}$ hydrocarbontrioltriacrylates, the polyether analogues thereof, and the like, such as 1,6-hexanedioldiacrylate, trimethylolpropanetriacrylate, triethyleneglycoldiacrylate, pentaeritritoltriacrylate, and tripropyleneglycol diacrylate, alkoxylated bisphenol A diacrylate, or dimethacrylate, like ethoxylated or propoxylated bisphenol-A-dimethacrylate.

Properties of reactive diluents and UV-cured urethane acrylates are described in *J. App. Polym. Sci.*, 37:1627–1636 (1995).

The composition further comprises a radical forming sulphur compound (D). With radical forming is ment, that in radical polymerization, the sulphur compounds is coreacted for at least 50%. Radical forming sulphur compounds are for example thiol or polysulphide comprising compounds. It is preferred to use alkanethiol, alkylesterthiol or dialkylpolysulphide compounds. Preferably, the reactive diluent forms thioether linkages during radiation-cure. Such thioether linkages can be formed by thiol-ene reactions. Aliphatic thiol compounds, such as $C_5$–$C_{30}$, preferably $C_5$–$C_{20}$ alkanethiol compounds, are suitable reactants. Examples of alkanethiols include 1-pentanethiol, 1-hexanethiol, 1-heptanethiol, 1-octanethiol, 1-decanethiol, 1-dodecanethiol, and the like. Compounds comprising a plurality of mercapto groups can be used, including di- and tri-mercapto compounds. A suitable alkylesterthiol is e.g. methylthiolglycolate or isooctyl-3-mercapto propionate. Suitable polysulphides include di- and tetrasulphides such as di-octyltetrasulphide.

Preferred examples of compounds (D) are compounds that also comprise a trialkoxy silane group, such as for example γ-mercaptopropyltrimethoxysilane and γ-mercaptopropyltriethoxysilane, trimethoxysilylpropyl tetrasulphide and others as represented by formulas (1a–b):

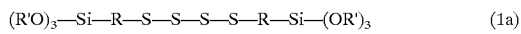
(R'O)$_3$—Si—R—S—S—S—S—R—Si—(OR')$_3$ (1a)

((R')$_3$—Si—(OR')$_3$)$_2$NH (1b)

wherein

R independently represent alkyl, preferably propyl; and

R' independently represents alkyl, preferably methyl.

Such thiol-ene systems, when copolymerized with acrylates, provide for compositions with superior adhesive qualities.

The composition may optionally further comprise at least one photoinitiator. The photoinitiator is required for fast UV cure. Conventional photoinitiators can be used. Examples include benzophenones, acetophenone derivatives, such as alpha-hydroxyalkylphenylketones, benzoin alkyl ethers and benzil ketals, monoacylphosphine oxides, and bisacylphosphine oxides. A preferred photoinitiator is 2 hydroxy-2-methyl-1-phenyl-propan-1-one(DAROCURE 1700™, Ciba Geigy). Another preferred example is 2,2-dimethoxy-2-phenyl acetophenone (IRGACURE 651™, Ciba Geigy). Other suitable chain transfer agents include mercaptobenzothiazoles, mercaptobenzooxazoles and hexaryl bisimidazole. Often, mixtures of photoinitiators provide a suitable balance of properties.

The photoinitiator should be present in sufficient quantity to provide fast cure speed, reasonable cost, good surface, through cure and lack of yellowing upon aging. Typical amounts can be, for example, about 0.1 wt. % to about 15 wt. %.

Additional compounds are commonly used in radiation-curable adhesives, and can be used in effective amounts.

Several additives may be included in the formulations. Minor amounts of UV absorbers, typically those of the benzotriazole, benzophenone or oxanilide type, or sterically hindered amine type (HALS) may be added as light stabilizers. Further customary additives as used in the art include fillers, chain transfer agents, plasticizers, wetting agents, stabilizers, adhesion promoters, leveling agents and/or silane-containing compounds. Mercaptosilanes, as described above, are preferred adhesion promoters. When thiol compounds other than mercaptosilanes are useful as silane-containing compounds for the present compositions, it is preferred to use silane adhesion promoters. Such silane adhesion promoters are known in the art. Examples include isocyanotoalkyltrialkoxysilanes, methacrylylalkyltrialkoxysilanes, amino alkyltrialkoxysilanes and epoxyalkyltrialkoxy silanes. The alkyl group generally is propyl, and as the alkoxy group, methoxy or ethoxy is preferred. Another suitable silane adhesion promoter is vinyltrimethoxysilane. Mercaptosilanes, such as mercaptopropyltrimethoxysilane and mercaptopropyltriethoxysilane, are particularly preferred. Thermal antioxidants may be used to improve thermal and oxidative stability. Other polymers and oligomers can be added to the compositions as needed.

Moisture content in the adhesive composition is preferably minimized.

Cure speed can be measured by dose-modulus curves as known in the art. Cure speed can be taken as the dose required to effect 95% of the maximum modulus. For an adhesive coating, UV cure speed is preferably about 1.0 J/cm$^2$, more preferably about 0.7 J/cm$^2$ or less at 95% of maximum attainable modulus.

For an adhesive coating, density at 25° C. is about 1.02 g/ml. Elongation (cured film elongation at break) is preferably at least 20% or more, and more preferably, about 50% or more and in particular about 100% or more. The weight loss of the cured adhesive at 100° C. for 40 min should be ≦5%, and shrinkage upon cure should be ≦10%, with respect to the density of cured material. Bond strength is preferably rated about 4 to about 5. Shear strength is preferably about 10 lbs to about 100 lbs. Cured adhesive bonds are preferably stable under exposure to about 85° C. at about 95% relative humidity for at least 250 hrs, more preferably for at least 2,000 hrs.

The present invention provides a UV-curable composition with good adherence to plastic, metallic, and ceramic substrates, a low viscosity and excellent optical and elongation properties. The composition may therefore be useful for bonding single-sided digital versatile discs together or bonding the individual layers comprising a single-sided disc. Other substrates may also be bonded by the adhesive composition. Unexpectedly superior adhesiveness is achieved with this composition, providing an excellent material to meet adhesion requirements for digital versatile disc manufacture.

The compounds forming the radiation curable adhesive composition were mixed together and coated on one surface of each of two polycarbonate substrates forming the DVD, which surfaces were already coated with an aluminum, gold or other layer encoded with audio, video or other information. The adhesive was coated on the substrates by spin coating or other method known in the art. The adhesive was then cured with ultraviolet radiation. Radiation-cure was effected using a fusion lamp equipped with a "D" bulb from Fusion Curing Systems, Rockville, Md., in an air atmosphere. The "D" lamp emits radiation of about 200 to about 470 nanometers with the peak radiation being at about 380 nanometers. The substrates were superimposed on each other with the adhesive bonding the substrate layers together, thereby forming a single VD having one or preferably two layers of encoded audio or video information which may be read in a DVD player. Substrate layers which may be bonded by the invention in various combinations comprise plastics, metallics and ceramics. The adhesive composition may be applied to the disc layers by spin coating, capillary gap dispensing or screen printing. Curing preferably is effected to obtain at least about 80% of the maximum attainable modulus, more preferably at least about 90% of said modulus.

Cured compositions can be examined for crystalline inclusions by optical microscopic methods. Conventional methods can be used to examine for these effects, although increasingly more stringent, high resolution analysis is required. Aging of cured films at, for example, 125° C., or at 95° C./95% relative humidity can be carried out to test for crystallization effects. Phase behavior can also be examined with use of a Polaroid camera, in a reflected light using differential interference contrast microscopy and a Leitz microscope. Magnifications of, for example, 200× or 500× can be used to determine crystallization and phase behavior effects.

The production of and useful characteristics for optical disc adhesives are discussed in, for example, U.S. Pat. Nos. 4,861,637, 4,906,675 and 5,213,947.

Optical disc production is described in, for example, Network Formation by Chain Crosslinking Photopolymerization and its Applications in Electronics, by J. G. Kloosterboer in ADV. POLYM. SCI., 1988, 84, pp. 1–61.

The invention will be further explained by the non-limiting examples which follow.

EXAMPLES

Example 1

A solution containing a polycarbonate urethane diacrylate oligomer (Tg 14° C. Desotech); N-vinylpyrrolidone (NVP), isobornylacrylate (IBOA), a thiol additive adhesion promoter, γ-mercaptotrimethoxysilane and the photoinitiator DAROCURE 1700™ (Ciba Geigy) was prepared utilizing the proportions listed in Table 1. The reagents were heated for 1 hr at 60° C., after which the components were mixed by shaking until homogeneous. The resulting material had a viscosity of 330 mPas, as measured by a Physica™ LC3 viscometer. This low viscosity permitted easy use of the material during spin coating. The polymer was subsequently tested for adhesive properties on DVDs.

TABLE 1

| Components | Example I wt. % |
|---|---|
| Polycarbonate urethane diacrylate oligomer | 46.5 |
| NVP | 10.0 |
| IBOA | 36.0 |
| γ-mercaptopropyl-trimethoxysilane | 3.50 |
| Darocure ™ 1700 | 4.0 |
| Viscosity (@ 25° C.) | 330 pas |
| Density (@ 25° C.) | 1.02 g/ml |
| Appearance | Clear liquid |
| Glass Transition Temp (Tg) | 35.5° C. |
| Weight loss (100° C./40") | 2% |
| Shrinkage upon cure | 5.5% |

NVP is N-vinylpyrrolidone.
IBOA is isobornylacrylate.
Darocure ™ 1700 is a photoinitiator.

Properties of Example 1 in DVD Binding

An aluminum disc was spin coated with a protective coating at 5,000 rpm for 5 s, then cured at 1 J/cm$^2$ using a Fusion D lamp. Thereafter, the protected aluminum disc was spin coated with an adhesive layer at 5,000 rpm for 10 s. Very thin layers of the adhesive can be achieved (about 15 μm thick) when a spin speed of 5,000 rpm is employed. A polycarbonate disc was placed on the adhesive-coated aluminum disc, and the two substrate discs were pressed together, avoiding the inclusion of any air bubbles. The adhesive between the discs was cured at 1 J/cm$^2$ using a Fusion D lamp (300 W/inch). Impact resistance (bond strength) of the bonded discs when dropped onto concrete from a height of 75 cm was measured before and after the adhered discs were exposed to environmental stress (85° C. at 95% relative humidity(RH) for 2,000 hrs). Shear stress of overlapping strips of bonded DVD were measured before and after environmental stress exposure, using standard instrumentation (Chatillon Mechanical Tester set for 1 inch/min. with a 500 N load cell). The results of these tests are presented in Table 2.

TABLE 2

| Bonded Digital Versatile Discs | Values |
|---|---|
| Shear strength of bonded strip @ 25° C. | 60 lbs |
| Shear strength of bonded strip @ 25° C. after environmental stress (72 hrs) | 63 lbs |
| Bond Strength, @ 25° C./40% RH (2,000 hrs) | 5 |
| Bond Strength, @ 85° C./95% RH (2,000 hrs) | 5 |

Examples 2 and 3

Formulations for Examples 2 and 3 were made and tested according to the methodology for Example 1. The compositions and test results of Example 2 and Example 3 are listed in Table 3. The ethoxylated bisphenol A polyurethane acrylate is characterized by Mn 1,000 and Tg 24° C.

TABLE 3

| Components | Example 2 (Wt. %) | Example 3 (Wt. %) |
|---|---|---|
| Acrylated acrylate oligomer | | 74.5 |
| Ethoxylated Bisphenol A polyurethane acrylate oligomer | 46.25 | |
| N-vinylcaprolactam | 8.5 | 8.5 |
| Isobornyl acrylate | 36.75 | 3.0 |

TABLE 3-continued

| Components | Example 2 (Wt. %) | Example 3 (Wt. %) |
|---|---|---|
| Ethoxyethoxyethyl acrylate | | 16.0 |
| γ-mercaptopropyltrimethoxysilane | 2.0 | 0.5 |
| Darocure ™ 1700 | | 3.0 |
| Darocure ™ 1173 | 3.0 | |
| Irgacure ™ 651 | 3.0 | |
| Irgacure ™ 1035 | 0.5 | |
| Viscosity (mPas @ 25° C.) | 700 | 1025 |
| Appearance | Clear liquid | Clear liquid |
| Bond strength @ 25° C./40% RH (250 hrs) | 5.0 | 5.0 |
| Bond Strength @ 85° C./95% RH (250 hrs) | 4.0 | 1.0 |

In Example 2, disc failure occurred at a shear strength of 25 lbs., measured @ 25° C., and 30 lbs., measured @ 25° C. after environmental stress exposure (85° C./85% RH, 72 hrs).

Examples 4–10

The compounds as shown in tables 4–7 forming the radiation curable adhesive composition are mixed together and coated on one surface of each of two polycarbonate substrates forming the DVD, as in the previous examples.

TABLE 4

| Components | Example 4 (Wt. %) |
|---|---|
| Acrylated acrylic oligomer (Mn 5,000) | 42.25 |
| N-dimethyl acrylamide | 8.5 |
| Isobornyl acrylate | 38.75 |
| γ-mercaptopropyl-trimethoxysilane | 2.0 |
| Photoinitiator (Darocure ™ 1173) | 3.0 |
| Photoinitiator (Irgacure ™ 651) | 3.0 |
| Photoinitiator (Irgacure ™ 1035) | 2.5 |
| Bond strength (250 hrs @ 25° C./45% relative humidity) | 5 |
| Bond strength (250 hrs @ 85° C./85% relative humidity) | delaminated |

TABLE 5

| Components | Example 5 (Wt. %) | Example 6 (Wt. %) |
|---|---|---|
| Alkoxylated bisphenol A polyurethane acrylate (Tg −14° C.) | 48.0 | |
| Alkoxylated bisphenol A polyurethane acrylate (Mn 1,000, Tg 24° C.) | | 35.0 |
| N-dimethyl acrylamide | 7.5 | 7.5 |
| Isobornyl acrylate | 36.0 | 49.0 |
| γ-mercaptopropyl-trimethoxysilane | 2.0 | 2.0 |
| Darocure ™ 1173 | 3.0 | 3.0 |
| Irgacure ™ 651 | 3.0 | 3.0 |
| Irgacure ™ 1035 | 0.5 | 0.5 |
| Viscosity (@ 25° C.) | 530 | 130 |
| Appearance | Clear liquid | Clear liquid |
| Bond strength (250 hrs @ 25° C./45% relative humidity) | 5.0 | 5.0 |
| Bond strength (250 hrs @ 85° C./85% relative humidity) | 4.0 | 5.0 |

TABLE 6

| Components | Example 7 (Wt. %) |
|---|---|
| Alkoxylated bisphenol A polyurethane acrylate (Mn 1,000, Tg 24° C.) | 46.5 |
| N-dimethyl acrylamide | 8.5 |
| Isobornyl acrylate | 36.0 |
| γ-mercaptopropyl-trimethoxysilane | 3.0 |
| Darocure ™ 1173 | 3.0 |
| Irgacure ™ 651 | 3.0 |
| Viscosity (pas @ 25° C.) | 447 |
| Coat time (sec) | 3.0 |
| Coat speed (rpm) | 4,000 |
| Bond strength (288 hrs @ 25° C./45% relative humidity) | 5.0 |
| Bond strength (288 hrs @ 80° C./95% relative humidity) | 4.0 |

TABLE 7

| Components | Example 8 (Wt. %) | Example 9 (Wt. %) | Example 10 (Wt. %) |
|---|---|---|---|
| Polycarbonate diacrylate oligomer | 53.5 | 21.95 | 28.0 |
| Urethane acrylate blended with Isobornyl acrylate (CN973J75 ™ from Sartomer Inc.) | | | 10.5 |
| N-dimethyl acrylamide | 7.0 | 1.0 | |
| Isobornyl acrylate | 22.75 | | 36.25 |
| N-vinyl caprolactam | | | 3.0 |
| 4-Hydroxy butyl acrylate | 9.5 | 32 | 15.0 |
| Hexane diol diacrylate | | 18.4 | |
| Ethoxylated₄ Bisphenol A Dimethacrylate | | 19.4 | |
| γ-mercaptopropyl-trimethoxysilane, A-189 | 1.0 | 1.0 | 1.0 |
| Darocure ™ 1173 | 3.0 | | 3.0 |
| Irgacure ™ 184 | | 2.0 | |
| Irgacure ™ 651 | 3.0 | 2.0 | 3.0 |
| Irgacure ™ 907 | | 2.0 | |
| Irgacure ™ 1035 | 0.25 | 0.25 | 0.25 |
| Viscosity (cps @ 25° C.) | 820 | 100 | 250 |
| Cured film density (g/cc) (@ 25° C.) | 1.13 | | 1.11 |
| Liquid density | | | 1.05 |
| Shrinkage (%) | 6.19 | | 5.4 |
| Bond Strength | 4 | 4 | 4 |
| Tensile Strength (MPa) | 11 | | |
| Modulus (MPa) | 17 | | |
| Elongation at break (%) | 123 | | |
| Glass Transition Temp (Tg) | | 26°C. | |

The inventive formulations, used as adhesives for bonded DVD discs, in particular, the urethane acrylate formulations, withstand an environment of at least 80° C. and 85% relative humidity, preferably at least 85° C. and 95% relative humidity. Acrylated acrylics tend to delaminate under extreme temperature and high humidity conditions, and thus urethane acrylate formulations are better suited for these circumstances.

Viscosity of the formulations is preferably in a range from about 100 mPas to about 1,000 mPas at 25° C. Bond strength and drop test results (after 6 days curing) are satisfactory, as is visual inspection. Preferably, bond strength is from about 10 lbs to about 100 lbs. Coat speeds and coat time indicate the properties of the adhesive compositions during spin coating.

The adhesives of the invention are not tacky to touch after curing.

FIG. 1 relates adhesive thickness, plotted on the ordinate, with spin speeds, plotted on the abscissa. A desired adhesive thickness can be obtained by selecting the appropriate spin speed, spin time and acceleration.

Figure 2:
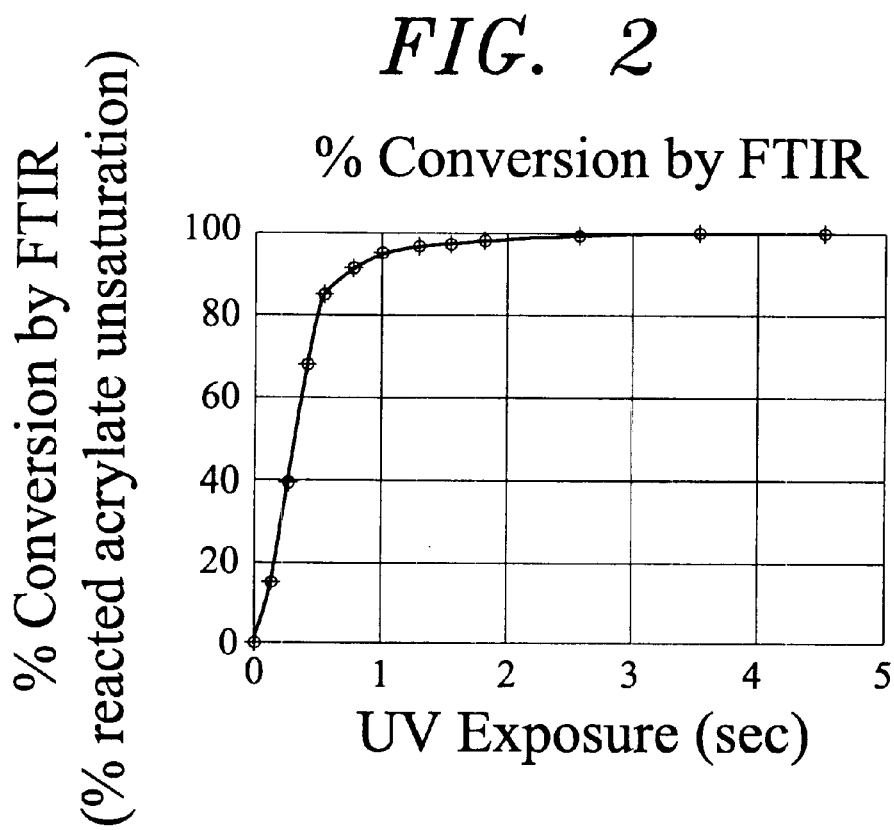
FIG. 2 relates the degree of cure (% unreacted acrylate unsaturation), measured by Fourier Transform Infrared Spectroscopy (FITR), with the amount of UV energy to which the adhesive is exposed.

FIG. 2 relates the degree of cure (% unreacted acrylate unsaturation), measured by FITR, with the amount of UV energy to which the adhesive is exposed. The data show that the adhesive composition undergoes exceptionally high conversion of liquid to solid at a relatively low level of UV energy.

Figure 3:
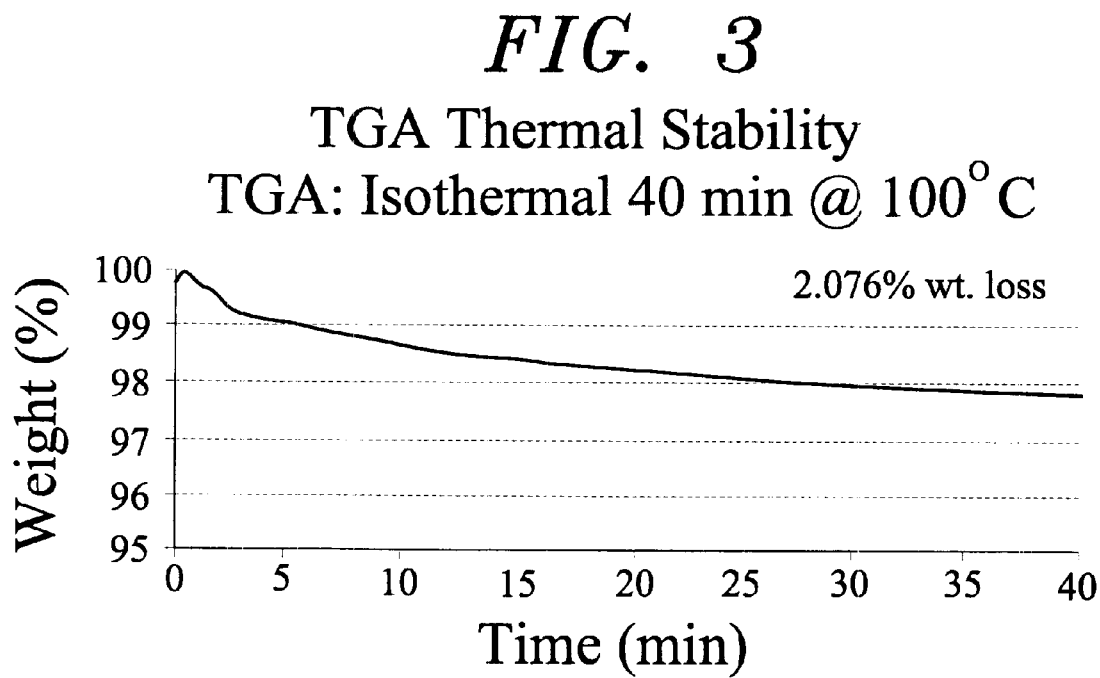
FIG. 3 shows the thermal stability of the cured adhesive composition, measured by Thermal Gravimetric Analysis (TGA).

FIG. 3 shows the thermal stability of the cured adhesive composition, measured by TGA. The high conversion of the composition during curing generates a thermally stable DVD bonding adhesive. The data also indicate that the composition undergoes extremely low weight loss (about 2%) at a test temperature of 100° C.

Test Methods

The test results were obtained using the following test methods.

Viscosity

The viscosity was measured using a PHYSICA MC10 Viscometer. The test samples were examined and if an excessive amount of bubbles was present, steps were taken to remove most of the bubbles. Not all bubbles need to be removed at this stage, because the act of sample loading introduces some bubbles.

The instrument was set up for the conventional Z3 system, which was used. The samples were loaded into a disposable aluminum cup by using the syringe to measure out 17 cc. Samples in the cup were examined for excessive amounts of bubbles, which if noted, were removed by a direct means such as centrifugation. Alternatively, enough time was allowed to elapse so as to let the bubbles escape from the bulk of the liquid. Bubbles at the top surface of the liquid were acceptable.

The bob was gently lowered into the liquid in the measuring cup, and the cup and bob were installed in the instrument. The sample temperature was allowed to equilibrate with the temperature of the circulating liquid by waiting five minutes. Then, the rotational speed was set to a desired value which produced the desired shear rate. The desired value of the shear rate is easily determined by one of ordinary skill in the art from an expected viscosity range of the sample.

The instrument panel read out a viscosity value, and if the viscosity value varied only slightly (less than 2% relative variation) for 15 seconds, the measurement was complete. If the reading varied, the temperature may not have reached an equilibrium value, or the material may have changed due to shearing. In the latter case, further testing at different shear rates was be needed to define the sample's viscous properties. The results reported are the average viscosity values of three test samples.

Bond Strength

The bond strength of bonded digital versatile discs bonded with a cured adhesive was measured via a drop testing method. The cured, bonded discs were dropped a vertical distance of 3 feet to a concrete surface, such that the outer edges of the bonded discs impacted the concrete. The impact resistance of cured sample adhesive compositions was qualitatively rated as noted hereinbelow.

Rating Scale of 1–5

1 Worst; delamination of the two disc halves occurred

5 Best; no sign of impact-induced delamination of the two disc halves

Shear Strength

The shear strength of the bonded discs were tested using a universal testing instrument INSTRON™ model 4201, equipped with a personal computer. Discs bonded with the adhesive compositions of the invention were subjected to opposing shearing forces. The force causing failure of the bonded discs was measured, and was denoted the shear strength of the bond. Adhesive failure caused the adhesive to delaminate, whereas disc failure occurred when the applied force caused the discs to break.

What is claimed is:

1. A radiation-curable adhesive composition for bonding digital versatile disc components comprising, relative to the total composition, the combination of the following pre-mixture ingredients:

(A) about 5 wt. % to about 80 wt. % of at least one radiation-curable oligomer selected from the group consisting of oligomers having a polycarbonate backbone and at least two (meth)acrylate groups;

(B) about 1 wt. % to about 10 wt. % of at least one non-acrylate functional reactive diluent;

(C) about 10 wt. % to about 80 wt. % of at least one acrylate functional reactive diluent;

(D) about 0.5 wt. % to about 10 wt. % of at least one radical forming sulphur compound; and (E) optionally about 0.1 wt. % to about 15 wt. % of one or more photoinitiators.

2. The adhesive composition according to claim 1, wherein the non-acrylate reactive diluent (B) is a compound comprising a vinyl-ether or N-vinyl group.

3. The adhesive composition according to claim 1, wherein the non-acrylate functional reactive diluent (B) is a compound comprising a (meth)acrylamide group.

4. The adhesive composition according to claim 3, wherein the compound comprising a (meth)acrylamide group is an alkyl acrylamide or an aryl acrylamide.

5. The adhesive composition according to claim 1, wherein the one or more photoinitiators are selected from the group consisting of mercaptobenzothiazoles, mercaptobenzooxazoles, benzophenones, acetophenone derivatives, benzoin alkyl ethers, benzil ketals, monoacylphosphine oxides and bisacylphosphine oxides.

6. The adhesive composition according to claim 1, wherein the radical forming sulphur compound comprises a mercapto group and a trialkoxysilane group.

7. The adhesive composition according to claim 1, wherein the radical forming sulphur compound comprises γ-mercaptopropyltrimethoxysilane or bis(trimethoxysilylpropyl)tetrasulphide.

8. The adhesive composition according to claim 1 wherein composition further comprises a silane-containing compound.

9. The adhesive composition according to claim 8 wherein said silane-containing compound includes isocyanotoalkyltrialkoxysilane, methacrylylalkyltrialkoxysilane, amino alkyltrialkoxysilane or epoxyalkyltrialkoxy slane.

10. The adhesive composition according to claim 1 wherein the radiation-curable oligomer is a urethane acrylate oligomer.

11. The adhesive composition according to claim 1, wherein said composition has a viscosity of about 100 to about 1,000 mPas at 25° C.

12. A digital versatile disc comprising a radiation-cured adhesive composition, wherein said adhesive composition before cure is the adhesive composition according to claim 1.

13. The digital versatile disc according to claim 12, wherein said composition is cured to attain at least 80% of its maximum attainable modulus.

14. The digital versatile disc according to claim 12, wherein the cured adhesive has less than or equal to 10% shrinkage upon cure.

15. The digital versatile disc according to claim 12, wherein said composition has a cured film elongation at break of >20%.

16. The digital versatile disc according to claim 12, wherein the digital versatile disc has a shear strength from about 10 lbs to about 100 lbs.

17. The digital versatile disc according to claim 12, further comprising at least one substrate comprising plastic, metal and/or ceramic.

18. The digital versatile disc according to claim 12, further comprising a further digital versatile disc bonded thereto.

19. The digital versatile disc according to claim 12, wherein the radiation-cured adhesive composition is stable under exposure to about 85° C. at about 95% relative humidity for at least 250 hours.

20. A method of bonding digital versatile disc layers, comprising bonding at least two of the layers of the disc with a radiation-curable adhesive composition according to claim 1.

21. The method according to claim 20, comprising applying the adhesive composition to the disc layers by spin coating, capillary gap dispensing, or screen printing.

22. A radiation-curable adhesive composition comprising the combination of the following pre-mixture ingredients:
 (A) about 15 wt. % to about 80 wt. % of at least one UV or radiation-curable oligomer selected from the group consisting of oligomers having a polycarbonate backbone and at least two (meth)acrylate groups;
 (B) about 1 wt. % to about 10 wt. % of at least one non-acrylate functional reactive diluent;
 (C) about 10 wt. % to about 80 wt. % of at least one acrylate monomer diluent;
 (D) about 0.5 wt. % to about 10 wt. % of at least one thiol compound; and
 (E) about 0.1 wt. % to about 15 wt. % of one or more photoinitiators.

23. A radiation-curable adhesive composition for bonding digital versatile disc components comprising, relative to the total composition, the combination of the following pre-mixture ingredients:
 (A) about 5 wt. % to about 80 wt. % of at least one radiation-curable oligomer selected from the group consisting of oligomers having an acrylic backbone and at least two (meth)acrylate groups;
 (B) about 1 wt. % to about 20 wt. % of at least one non-acrylate functional reactive diluent;
 (C) about 10 wt. % to about 80 wt. % of at least one acrylate functional reactive diluent;
 (D) about 0.5 wt. % to about 10 wt. % of at least one radical forming sulphur compound; and
 (E) optionally about 0.1 wt. % to about 15 wt. % of one or more photoinitiators.

24. A radiation-curable adhesive composition for bonding digital versatile disc components comprising, relative to the total composition, the combination of the following pre-mixture ingredients:
 (A) about 5 wt. % to about 80 wt. % of at least one radiation-curable oligomer selected from the group consisting of oligomers having a polyarylic backbone and at least two (meth)acrylate groups;
 (B) about 1 wt. % to about 20 wt. % of at least one non-acrylate functional reactive diluent;
 (C) about 10 wt. % to about 80 wt. % of at least one acrylate functional reactive diluent;
 (D) about 0.5 wt. % to about 10 wt. % of at least one radical forming sulphur compound; and
 (E) optionally about 0.1 wt. % to about 15 wt. % of one or more photoinitiators.

25. The composition of claim 24, wherein said oligomer is an alkozylated bisphenol A oligomer.

* * * * *

UNITED STATES PATENT AND TRADEMARK OFFICE
CERTIFICATE OF CORRECTION

PATENT NO. : 6,472,451 B2
DATED : October 29, 2002
INVENTOR(S) : Ha et al.

Page 1 of 1

It is certified that error appears in the above-identified patent and that said Letters Patent is hereby corrected as shown below:

<u>Title page,</u>
Insert Item
-- [30]      Foreign Application Priority Data

March 24, 1999 (PCT)................................PCT/NL99/00168. --

Signed and Sealed this

Twenty-first Day of December, 2004

JON W. DUDAS
*Director of the United States Patent and Trademark Office*